US012567090B2

(12) United States Patent
Burnette et al.

(10) Patent No.: US 12,567,090 B2
(45) Date of Patent: Mar. 3, 2026

(54) DEVICES, SYSTEMS AND METHODS FOR AUTONOMOUSLY MONITORING CUSTOMER USE OF EQUIPMENT AND BILLING VIA A BLOCKCHAIN NETWORK

(71) Applicant: IOT-eq, LLC, Spring, TX (US)

(72) Inventors: Blake Burnette, Magnolia, TX (US);
Brad Brooks, Magnolia, TX (US);
Iniaki Zuloaga, Tomball, TX (US);
Jose Guerrero, Spring, TX (US)

(73) Assignee: IOT-eq, LLC, Spring, TX (US)

( * ) Notice: Subject to any disclaimer, the term of this patent is extended or adjusted under 35 U.S.C. 154(b) by 487 days.

(21) Appl. No.: 17/812,906

(22) Filed: Jul. 15, 2022

(65) Prior Publication Data

US 2023/0018133 A1     Jan. 19, 2023

Related U.S. Application Data

(60) Provisional application No. 63/222,787, filed on Jul. 16, 2021.

(51) Int. Cl.
| | |
|---|---|
| *G06Q 30/04* | (2012.01) |
| *G01D 21/00* | (2006.01) |
| *G06Q 20/06* | (2012.01) |
| *G06Q 20/36* | (2012.01) |
| *G06Q 20/40* | (2012.01) |

(52) U.S. Cl.
CPC ............. *G06Q 30/04* (2013.01); *G01D 21/00* (2013.01); *G06Q 20/0658* (2013.01); *G06Q 20/3678* (2013.01); *G06Q 20/403* (2013.01); *G06Q 2220/12* (2013.01)

(58) Field of Classification Search
CPC ............... G06Q 30/04; G06Q 20/0658; G06Q 20/3678; G06Q 20/403; G06Q 2220/12; G06Q 20/02; G06Q 20/065; G06Q 20/223; G06Q 20/3827; G06Q 20/3829; G06Q 20/389; G06Q 20/401; G06Q 20/4016; G01D 21/00
See application file for complete search history.

(56) References Cited

U.S. PATENT DOCUMENTS

| | | | |
|---|---|---|---|
| 10,891,613 B1* | 1/2021 | Schindler | ........... G06Q 20/3678 |
| 2016/0063216 A1 | 3/2016 | Hasei | |
| 2017/0321532 A1* | 11/2017 | Burnette | ................... G01F 3/00 |

(Continued)

FOREIGN PATENT DOCUMENTS

| JP | 2005309702 A | 11/2005 |
|---|---|---|

OTHER PUBLICATIONS

Dzuik, Types of GPS Tracking for Rental Equipment and Top 6 Benefits, Mar. 1, 2021, https://web.archive.org/web/20210317190302/https://info.rastrac.com/blog/gps-tracking-for-rental-equipment (Year: 2021).*

(Continued)

*Primary Examiner* — Aaron N Tutor
(74) *Attorney, Agent, or Firm* — K&L Gates LLP

(57) ABSTRACT

An apparatus for charging fees to a renter of equipment based upon wear to an item of equipment is disclosed herein. The apparatus can include a communications device proximal to the equipment that charges the renter, via a connected blockchain network, based off of the amount of vibration, pressure, flow rate, or temperature that the item of equipment is subjected to.

17 Claims, 5 Drawing Sheets

100

(56)                    References Cited

U.S. PATENT DOCUMENTS

| | | |
|---|---|---|
| 2018/0341999 A1 | 11/2018 | Awan et al. |
| 2019/0361917 A1* | 11/2019 | Tran ................... H04W 12/108 |
| 2020/0314095 A1 | 10/2020 | Jentzsch et al. |
| 2021/0038141 A1 | 2/2021 | Yun |
| 2021/0295322 A1* | 9/2021 | Xiao ................. G06Q 20/0855 |

OTHER PUBLICATIONS

R. Kh. Arifulin, Shut-off Device for Well-Head Equipment, Jan 2012, Chemical and Petroleum Engineering, vol. 48, pp. 35-39 (Year: 2012).*

International Search report and the Written Opinion dated Nov. 11, 2022 for PCT Patent Application No. PCT/US2022/073798 filed on Jul. 15, 2022.

* cited by examiner

107

210

202

210

210

204

206

210

210

208

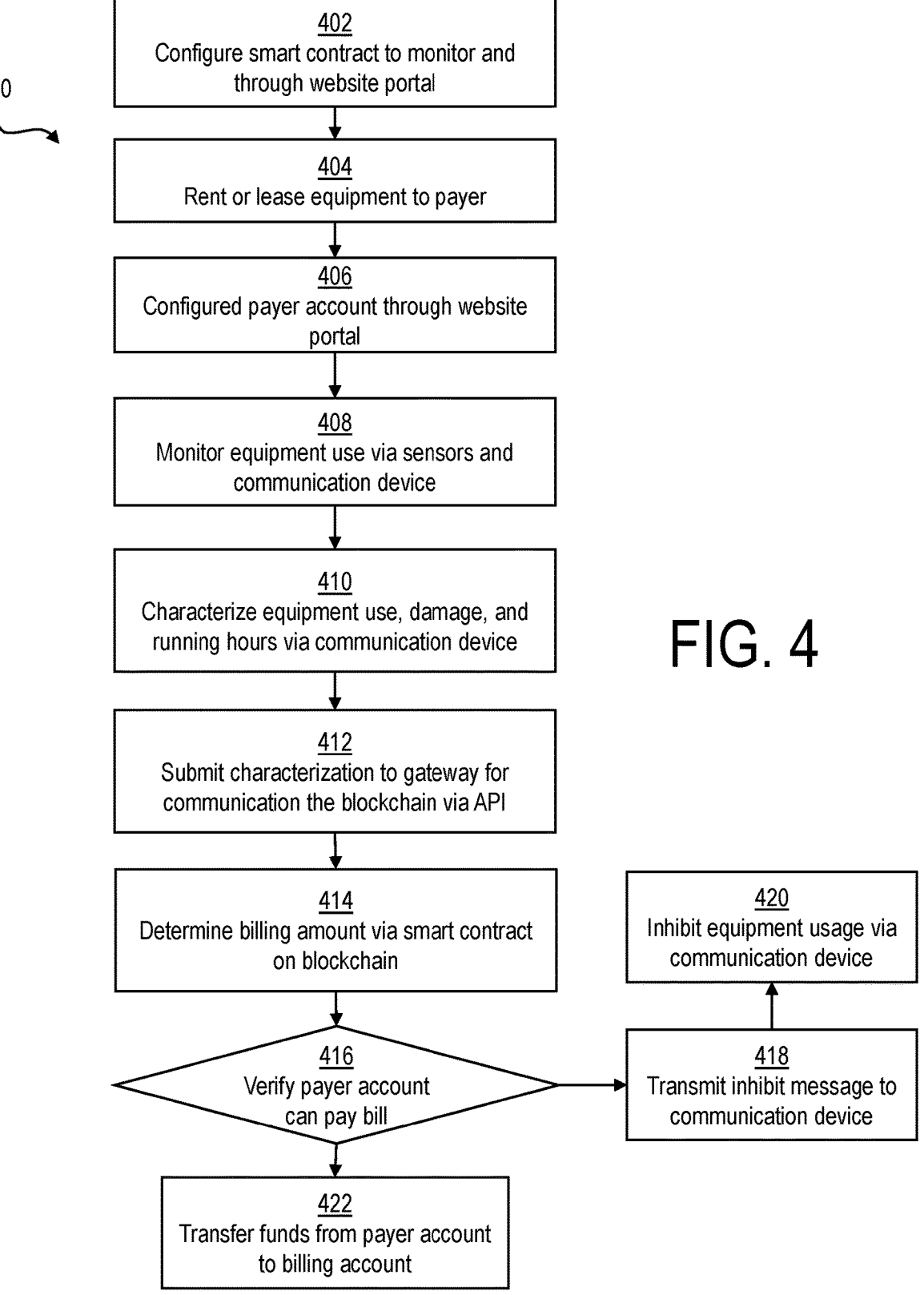

400

402
Configure smart contract to monitor and through website portal

404
Rent or lease equipment to payer

406
Configured payer account through website portal

408
Monitor equipment use via sensors and communication device

410
Characterize equipment use, damage, and running hours via communication device

412
Submit characterization to gateway for communication the blockchain via API

414
Determine billing amount via smart contract on blockchain

416
Verify payer account can pay bill

418
Transmit inhibit message to communication device

420
Inhibit equipment usage via communication device

422
Transfer funds from payer account to billing account

FIG. 4

DEVICES, SYSTEMS AND METHODS FOR AUTONOMOUSLY MONITORING CUSTOMER USE OF EQUIPMENT AND BILLING VIA A BLOCKCHAIN NETWORK

FIELD

The present disclosure is generally related to dynamic means of managing equipment and, more particularly, is directed to autonomous assessment of equipment usage and billing customers via tokens hosted on a blockchain network.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, an apparatus for charging fees to a renter of equipment based upon wear to an item of equipment is disclosed. The apparatus can include a communications proximal to the equipment that charges the renter, via a connected blockchain network, based off of the amount of vibration, pressure, flow rate, or temperature that the item of equipment is subjected to.

In various aspects, a method of billing a payer based upon wear to an item of equipment is disclosed. The method can include: at least one data processor proximal to or even mounted on the equipment item automatically charging the payor in cryptocurrency based upon the duration of use or amount of vibration, pressure, flow rate or temperature that the equipment item is subjected to.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 4 illustrates a flow chart of a method of monitoring a customer's use of equipment and billing via a blockchain network, in accordance with at least one non-limiting aspect of the present disclosure.

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
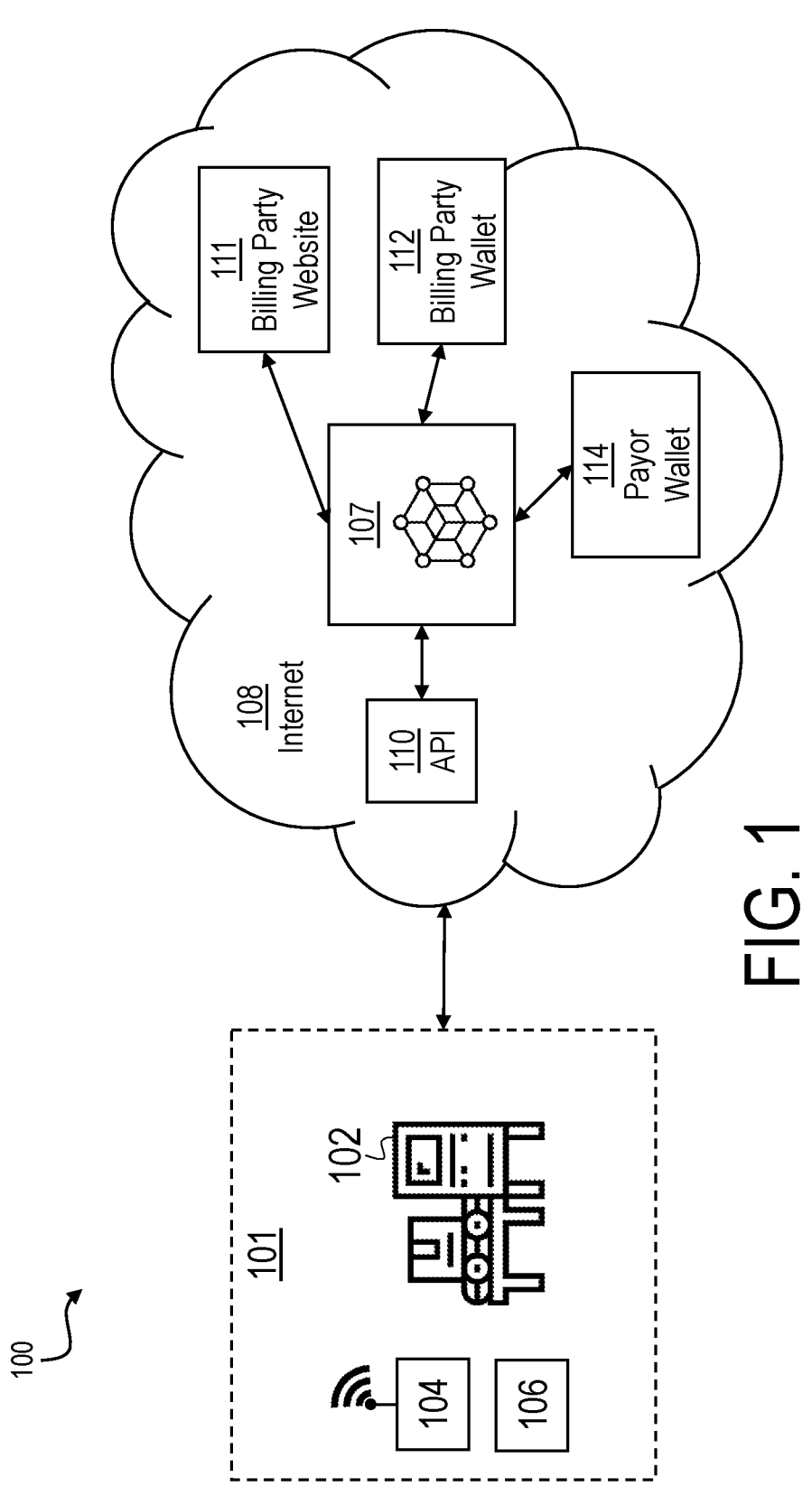
FIG. 1 illustrates a block diagram of a system configured to manage the operation of equipment and automatically bill customers for use of the equipment, in accordance with at least one non-limiting aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before discussing specific embodiments and examples, some descriptions of terms used herein are provided below.

In showing and describing preferred embodiments in the appended figures, common or similar components, features and elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein, the term "industrial" can include any device and/or environment related to or characterized by any industry. Although in some non-limiting aspects, the term "industrial" can include machinery deployed within a factory, it shall be appreciated that, according to other non-limiting aspects, the term "industrial" can include any commercially marketable device positioned in any environment. For example, the present disclosure contemplates industrial uses of commercially available products, such as computers, smartphones, servers, and/or other equipment licensed to entities for use in an office, or business park, or field site, for example. However, use of the term "industrial" can further include equipment licensed and/or leased by a single consumer for personal use, such as the lease of a vehicle.

As used herein and throughout various portions (and headings) of this patent, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. It should also be noted that the use of "(s)" in reference to an item, component or action (e.g., "surface(s)") throughout this patent should be construed to mean "at least one" of the referenced item, component or act.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ". Further, reference herein and in the appended claims to components and aspects in a singular tense does not necessarily limit the present disclosure or appended claims to only one such component or aspect, but should be interpreted generally to mean one or more, as may be suitable and desirable in each particular instance.

As used herein and in the appended claims, the following terms have the following meanings, except and only to the extent as may be expressly specified differently in a particular claim hereof and only for such claim(s) and any claim(s) depending therefrom:

The term "and/or" as used herein provides for three distinct possibilities: one, the other or both. All three possibilities do not need to be available—only any one of the three. For example, if an embodiment of a component is described as "having a collar and/or a coupling", it may include only one or more collars, only one or more couplings or at least one of each. Thus, the use of "and/or" herein does not require all three possibilities, just any one or more of the three possibilities. A claim limitation herein that recites "having a collar and/or a coupling" would be literally infringed by a device including only one or more collars, one or more couplings or both one or more couplings and one or more collars.

The terms "coupled," "connected," "engaged," and the like, and variations thereof, mean and include either an indirect or direct connection or engagement. Thus, if a first device couples to a second device, that connection may be through a direct connection, or through an indirect connection via other devices and connections.

The terms "generally," "substantially," and variations thereof as used herein mean and include greater than 50%.

The terms "party," "billing party," "payor," and the like mean and include one or more humans, robots or robotic components, artificial intelligence-driven components/circuitry, other components, and the like.

As used herein, the adjective "smart" can include any device or sensor that has a processor or processing capability inherent to it. For example, as used herein a "communications device" may include a processor that can enable the communication device to not only receive and transmit data between a sensor and the internet, but process it and issue commands to equipment based on the processing it performs. As such, as used herein, a "communications device" can include a smart device, otherwise known as an internet-of-things ("IoT") device.

Monitoring equipment operation and wear is important for various reasons, such as predictive maintenance, optimizing equipment efficiency and effectiveness and preserving equipment integrity and longevity. For example, equipment owners and related parties who rent, lease or loan equipment (e.g., pumps, engines, transmissions, vehicles, generators, air compressors, natural gas compressors, heavy-duty commercial and industrial devices and systems, etc.) may have a vested interest in knowing whether the equipment is being subject to abuse, overuse, excessive wear, etc. In various embodiments, the present disclosure is directed to apparatus, systems, and methods for charging fees for the use of equipment based, at least in part, upon any measurable indicator(s) of wear, damage, use, excessive use, unauthorized use, misuse, or underuse (referred to herein as "wear-based billing"). For example, when high vibration of equipment can increase wear on the equipment, shorten its life, or result in higher maintenance costs, the wear-based billing may be based, at least in part, upon the vibration of the equipment.

In some embodiments, the wear-based billing may also include the collection of the wear-based billing (and other) fees, be automated, made in real-time, made on a continuing basis or a combination thereof. In various embodiments, the present disclosure also or instead includes apparatus, systems, and methods for controlling the use or operation of the equipment based upon wear, damage, use, excessive use, unauthorized use, misuse, or underuse (collectively referred to herein as "wear-based control"). In some cases, the wear-based control of the equipment may be tied to wear-based billing and/or the payment or collection of fees, be automated, made in real-time, made on a continuing basis, or a combination thereof.

For the reader's convenience, the customer, lessee, or party or parties who are charged or pay the wear-based billing fees and use the equipment, or any of their representatives are sometimes referred to herein as the "payor." Similarly for convenience, the party or parties who own, rent, lease, or loan the equipment, their representative(s), or whomever is implementing the wear-based billing or wear-based control of equipment are sometimes referred to herein as the "billing party". It should be understood, the terms payor and billing party are not limiting upon the present disclosure; they can be anybody or any party (even if they are not the actual paying or billing party). It should also be understood that the type, nature, or configuration of equipment being monitored is not limiting upon the present disclosure. Thus, some objects of various embodiments of the present disclosure are: providing a fully-automated system for wear-based billing in real-time on a continuing basis; providing a fully-automated system for wear-based operation of equipment in real-time on a continuing basis; enabling the billing party to automatically, continuously, and in real-time recover its costs for use of or wear to the equipment (e.g., when the equipment is being treated roughly); automatically, continuously and in real-time control or vary operation of the equipment (e.g., when the payor lacks sufficient funds to pay the amount owed); reducing days of invoicing, thereby putting the payor's money to work faster and providing cost benefits; allowing the payor to benefit (e.g., via cost-saving) from limited use of the equipment; enabling the payor to have financial control of its expenditures; other objects that are, or will be, apparent from the present specification, claims and drawings; or a combination thereof.

In accordance with one or more embodiments of the present disclosure, one or more sensors, meters, or on-board or integrated components (individually and collectively, the "sensor") can be mounted to, or otherwise associated with, the equipment to detect, measure, monitor and/or track vibration, pressure, temperature, fluid flow, run-time (e.g., power by the hour) or any other measurable variable(s) relating to use or non-use of the equipment (individually and collectively, "wear variables"). The sensors may have any form, configuration, location and operation. Some possible examples of sensors are vibration, pressure or temperature sensors, flow meters and the like and on-board or integrated diagnostic electronics, such as computers, programmable chips, PC boards, etc. However, the present invention is not limited to or by the type, location or other details of the sensor. Additionally, the present invention is not limited by the type, nature, or other details of the wear variables, which could be any measurable variables relating to use or non-use of the equipment.

Various embodiments of the present disclosure involve automated systems and methods for using data taken by the sensor (the "wear data") to quantify or determine use, wear, damage, excessive use, unauthorized use, misuse, or underuse of or to the equipment (individually and collectively, "damage factors"). The particular damage factors that may exist for an item of equipment may depend upon the nature of the equipment, the environment within which it is used, and/or other variables. For example, for certain machines or systems, the damage factors may include the duration of use of the equipment, duration it has run with excessive vibration, duration it has run at a certain (e.g., high) temperature or with low oil pressure, bearing failure, clogged filters, or without being fed enough fluid (e.g., pumps), and the like. If desired, one or more damage factors may be negative-damage factors that can benefit the payor, such as when the equipment is used less than expected, or the payor improves the performance of the equipment, conducts maintenance to the equipment, and the like. Thus, the present disclosure is not limited to or by the type or nature of the damage factors or any details relating thereto.

The damage factors can be determined in any suitable manner. In various embodiments, one or more data processors, or communications devices 104 that include data processors, electronically coupled to the sensor (e.g., via hard wire or wireless connection) automatically receives wear data from the sensor and/or regularly automatically checks the sensor for wear data (e.g., in real-time) as desired. The exemplary data processor may thereafter automatically and in real-time determine what, if any, damage factors have occurred, or will occur, based, at least in part, upon the wear data, or may forward the wear data or information relating to the wear data (e.g., its translation of the wear data into software code) to one or more other recipients or parties to make that determination.

In these embodiments, when damage factors have been identified, the wear-based billing and wear-based control of the equipment can be determined in any suitable manner. For example, one or more electronic or automated recipients of the identified damage factors, such as computer software, programmable chips, IC boards, computers, Smart Contracts, or the like, (individually and collectively, the "recipient"), can compare the damage factors to one or more pricing schedules, contract terms, rate sheets, or damage factor/equipment usage tables, apply the damage factor to one or more algorithms or formulas, or otherwise process the damage factors to determine the amount to be billed (refunded or credited) and/or whether to stop or limit operation of the equipment. In some instances, artificial intelligence, data analytics, neural networks, the Fast Fourier Transform (FFT), or the like can be used to make those determinations. For example, the recipient(s) of the data may, automatically and in-real time, compare the recorded wear data against stored, known, accumulated or predicted values associated with particular damage factors to determine which, if any, have occurred or may occur. Special electronic (e.g., analog) filters may, in some instances, save processing time or simplify necessary software. In some embodiments, the data processor may perform such analysis of the damage factors to determine the amount to be charged (refunded or credited) or whether to stop or limit operation of the equipment, or may forward the damage factors and/or other data to one or more other recipients to make those determinations.

Likewise, the wear-based billing fees can be charged or credited to the payor and/or the operation of the equipment varied in any suitable manner. For example, the data processor may communicate directly, or through one or more other recipients, with the billing party's and payor's bank or credit card accounts or other electronically accessible wallets or ledgers to charge or credit the payor (e.g., automatically, in real-time, on a continuing basis). If desired, payment may also be automatically transferred from the payor to the billing party or vice versa. For example, the payor can pre-authorize debits to its account so funds can be automatically, electronically transferred from the payor to the billing party (e.g., its electronic bank account, wallet or ledger) in real-time on an ongoing basis. Any desirable criteria can be used to pre-authorize payment, such as setting a maximum amount per time period or event, the type or other details of the damage factor(s), etc.

Similarly, with respect to wear-based control of the equipment, the data processor may communicate directly with the equipment item to disable it or otherwise change its operation, or communicate with one or more other recipients to effect the change in operation of the equipment.

When included, the data processor may have any suitable form, configuration, operation, and location. In some embodiments, the data processor includes one or more electronic modules that receives or reads the sensor output (wear data) and determines the damage factors based thereupon. For example, a single IOT device (e.g., with one or multiple PC board modules, microprocessors, edge computers, etc.) can perform both these data processor functions. For another example, the data processor may include one or more stand-alone electronic data acquisition units (DAU) that receive the wear data and, if desired, convert it into a desired format (e.g., to computer code), then forward the information to a second data processor unit (e.g., edge computer, IOT device) which determines the damage factors. In some instances, the data processor includes network data transmission capabilities, such as gateway functionality, to transmit the damage factor data to one or more other recipients (e.g., API, Smart Contract, billing party website, etc.) via the Internet or any other network. In other embodiments, the data processor may instead transmit the damage factor data through one or more separate data transmission units (e.g., gateways) to one or more other recipients.

Although not required, if desired, the data processor may be electronically and/or physically coupled to the equipment. For example, the communications device and/or the data processor can be a single IoT device that includes data acquisition, computing, and network communication (e.g., gateway) capabilities proximal to or positioned proximate to the equipment item(s). For example, according to some non-limiting aspects, the communications device and/or the data processor can also be mounted to the equipment. According to other non-limiting aspects, the communications device and/or the data processor may be located within the same environment as the equipment. In some embodiments, the IOT device may be easily, releasably coupled to a variety of types of equipment with one or more magnets. For another example, the data processor may include: (i) a DAU coupled to the equipment, and (ii) an edge computer that communicates with the DAU and one or more separate network communication units (e.g., gateways). For yet another example, such as when monitoring wear data on multiple items of equipment, the data processers may include a separate DAU associated with each equipment item, which communicate with corresponding separate edge computers or IOT devices or which all communicate with a central edge computer or IOT device. Likewise, the data processor may be directly, or though one or more other components (e.g., switches), coupled to the equipment item in order to control its operation. Thus, the data processor, when included, can include any combination of desired components situated in any suitable configuration. Moreover, any desired configuration of components may be used to implement the wear-based billing and wear-based control capabilities.

In one example operation, the level of vibration of an equipment item may be monitored (e.g., in real-time throughout the duration of use) with one or more vibration sensors and/or onboard diagnostic electronics. An exemplary DAU coupled to the equipment may receive and translate that vibration data into a desired format and provide it to an IOT device. The IOT device may compare the vibration (e.g., wave form) signatures of the equipment with a pre-determined vibration value spectrum, or known or forecasted vibration signatures associated with particular damage factors, to determine if and which damage factors apply and communicate them to one or more recipients (e.g., via one or more gateway, API, etc.). One or more designated recipients (e.g., Smart Contract) may calculate the fee, if any, to be charged on the basis of the damage factors and proceed to charge the payor and, in some cases, also execute the transfer of funds.

In some embodiments, the present disclosure involves the use of blockchain, cryptocurrency, Smart Contracts, or a combination thereof in implementing the wear-based billing and/or wear-based control. For example, the wear-based billing (e.g., and run-time) fees can be charged and collected in cryptocurrency.

As general background, cryptocurrencies typically use distributive computing. For example, thousands of computers may be running special software, often called nodes, which keep track of a distributed ledger of cryptocurrency ownership across all the computers. The process of keeping these distributed ledgers (i.e., who owns the cryptocurrency) is sometimes referred to as blockchain, where each coin or token is believed to be represented as a block and has the address of the previous block, and each block has its own ledger (list of owners). The nodes are believed to constantly compare themselves to each other to ensure accuracy and prevent hacking and theft, and accept and respond to commands sent to them over the Internet to allow owners of the coins listed in the ledger to transfer their ownership to a different owner. In some embodiments of the present disclosure, these commands could originate from the exemplary data processor or other recipient(s) for the execution of transfers of coins between crypto wallets of the payor and billing party for wear-based billing.

In many embodiments, Smart Contracts may be used in connection with wear-based billing and/or wear-based control of equipment. For example, on the Ethereum and other cryptocurrency networks, it is believed that programs (e.g., attached to the blockchain) can be executed across the distributed network to allow Smart Contracts to be completed and executed. The exemplary data processor may provide commands to the pertinent Smart Contract to determine wear-based billing charges based upon damage factors (e.g., run-time), send back information (e.g., payor wallet good-standing status) and execute crypto-currency ownership transfers in accordance with the terms of Smart Contract. For example, the pertinent Smart Contract may have settable properties the billing party can configure to enable the Smart Contract to determine the amount of fees to charge (or credit) based upon the damage factors, equipment run-time or other variables.

There are also centralized exchange computers that typically have an application program interface (API) that may make it easy to transfer the ownership of crypto or other forms of currency from one owner to another. In various embodiments, the exemplary data processor may send messages (e.g., in JSON format) to the API (e.g., Infura API or other Web3 APIs), which forwards the messages to the designated recipient(s) (e.g., one or more Smart Contract(s), electronic bank account, credit card processor, such as Square or Swipe, etc.). For example, these messages may instruct the designated recipient (e.g., web server, Smart Contract) to carry out certain functions, like write data to a database (e.g., to determine wear-based billing charges based upon the damage factors and/or run-time), send back information (e.g., good-standing status), execute credit card charges or crypto-currency ownership transfers, and the like.

In operation of various embodiments, as the exemplary data processor analyzes the wear data from the sensors on the equipment, the data processor will periodically submit commands or data directly to a Smart Contract or to the API of a centralized exchange (then to the Smart Contract). In these embodiments, the Smart Contract will calculate a wear-based billing fee based upon criteria it received from the billing party (or other source) and institute a wear-based billing transaction that charges the payor based at least partially upon the wear factors. In various embodiments, the amount that payor is charged=(each damage factor×the pertinent damage factor charge rate)+hourly usage rate.

The exemplary data processor may also trigger one or more wear-based control events. This triggering may be done to temporarily shut off the equipment or otherwise limit the operation thereof (e.g., run-time, rpm, etc.) in any suitable manner. For example, the data processor may have a run enable output signal to the equipment (e.g., its ignition, motor, engine, etc.) that changes operation of the equipment under certain circumstances, such as for certain damage factors or when a wear-based billing (or other) transaction is declined at the payor's account or otherwise does not go through. In some embodiments, the data processor determines the state of the run enable output signal based upon a good standing status flag within the Smart Contract and which reflecting whether the payor has sufficient funds in its crypto wallet to pay a wear-based billing (and/or other) fee.

Approve, good standing refresh, and/or transfer functions may be used in connection with various embodiments of the present disclosure. For example, an approve function, when included, can be an input or command (e.g., signature) from the payor that reflects its approval for a party (e.g., the Smart Contract) to access to certain amounts of (e.g., crypto) currency and transfer the funds to the billing party (e.g., from one crypto wallet to another). Such approve function can provide the payor with financial control of its expenditures.

The transfer function, if included, may be called to actually move the funds from the payor's account (e.g., crypto wallet) to the billing party's account (e.g., crypto wallet) or vice versa. In some embodiments, the transfer function may involve implementation of the pricing schedule, smart contract terms rate-sheet, tables, algorithms, formulae, artificial intelligence, data analytics, neural network(s) or the like for calculating the amount of fees based upon the damage factors and/or run-time or other variables.

A good standing refresh function may, for example, use a timer or interrupt feature to refresh a good standing status or flag associated with the payor's ability to pay the calculated fees, such as by comparing the payor's account (e.g., crypto wallet) balance with the approved amount for each transaction. In various embodiments, the data processor could directly, or through one or more other recipients, check the pertinent Smart Contract (or other source) for the amount of preapproved funds and the pertinent blockchain or currency account to determine whether enough funds are present for upcoming fees.

To implement some embodiments of the present disclosure, the data processor (e.g., edge computing device) on the equipment item or other recipient (e.g., Smart contract) may be provided with pricing schedules and/or Smart Contract terms from a centralized database that the billing party can remotely administer (e.g., from a webpage or software program, FIG. 1). For example, the billing party may enter amounts (e.g., cryptocurrency) that the payor will be charged for various levels of each damage factor (e.g., amounts of vibration, pressure, flow rate, temperature and the like). As each data processor analyzes the signals coming from the sensors, it may calculate the wear-based billing fee (or credit or refund) from a pricing schedule it received from the central database. If desired, the data processor may periodically initiate a transaction either to the API of a centralized exchange, or directly to the pertinent cryptocurrency nodes, that charges (or credits) the payor based upon one or more damage factors and/or other variables. In some embodiments, the data processor may have an output signal that inhibits the use of the equipment at the occurrence of any desired event, such as if a transaction is not executed.

It should be understood that any of the above actions may be performed with the use of any other type of recipient and in any other desired order. Also, any components of the present embodiments that communicate with each other, the equipment item or other recipient or party may be hard-wired or communicate wirelessly, as desired.

Referring now to FIG. 1, a block diagram of a system 100 configured to manage the operation of industrial equipment 102 and automatically bill customers for the use and wear of industrial equipment 102 is depicted in accordance with at least one non-limiting aspect of the present disclosure. According to the non-limiting aspect of FIG. 1, the system 100 can include a piece of equipment 102 positioned within an environment 101, a sensor 106, and a communication device 104 communicably coupled to the sensor 106 and configured to transmit signals received from the sensor 106 via one or more wired and/or wireless communication protocols. For example, the equipment 102 of FIG. 1 can include a piece of industrial equipment, including system level tools and fabrication equipment (e.g., engines, motors, conveyor belts, robots, cranes, computer numerical control machines, power saws, drills, lathes, metal-working machines, polishing machines, presses, boilers, industrial ovens, nuclear reactors, scales, autoclaves, thermal chambers, vibration tables, centrifuges, mixers, electric generators, air compressors, material handling equipment, electrochemical and/or electrolytic machining devices, three-dimensional printers, etc.), storage tanks, data acquisition units, hand tools (e.g., hammers, hand drills, saws, etc.), custom built equipment or machines, and/or any other piece of capital equipment. However, according to other non-limiting aspects, the equipment 102 of FIG. 1 can include a number of other commercially marketable products, such as computers, smartphones, servers, and/or other equipment licensed to entities for use in an office, or business park, or field site, for example. The equipment 102 of FIG. 1 can be positioned within a physical environment 101, such as a factory, a field-site, a launch pad, a vehicle, an office, a business park, and/or a residential home, amongst other locations of interest. For example, according to one non-limiting aspect, the system 100 can be implemented to monitor and characterize the use of equipment, including the engine and/or various other systems 102 of a leased vehicle.

In further reference to FIG. 1, one or more sensors 106 can include any individual analog and/or smart sensors (e.g., cameras, infrared cameras, vibration sensors, temperature sensors, pressure sensors, accelerometers, gyroscopes, air quality sensors, ambient light sensors, angular position and linear position sensors, board mount pressure sensors, color sensors, current sensors, fan sensors, flow sensors, level sensors, etc.) configured to detect various conditions associated with the equipment 102. Thus, one or more sensors 106 can generate signals configured to characterize various conditions (e.g., damage, wear, fatigue, etc.) of the equipment 102.

According to the non-limiting aspect of FIG. 1, the communication device 104 can include an internet-of-things (IoT) device, meaning, a physical object that includes, or is configured to communicate with one or more sensors 106 and can support processing abilities, software, and other technologies that enable the exchange data with other devices and systems over the internet 108, or other communications networks. However, according to other non-limiting aspects, the communication device 104 can include a simple transceiver configured to send and receive data to and from one or more sensors 106 and a remote server for processing via the internet 108. In still other non-limiting aspects, the processing and transmitting features of the communication device 104 can be condensed into the sensors 106 or the sensing functionality of the sensors 106 can be condensed into the communication device 104. Accordingly, the discrete blocks 104, 106, as depicted in FIG. 1, shall not limit the present disclosure to two separate devices 104, 106.

In other words, the communication device 104 of FIG. 1 can either independently process and/or relay signals from the sensor 106 for processing, such that the signals generated by the sensor 106 can be correlated with one or more conditions of the equipment 102, as detected by the one or more sensors 106. In some non-limiting aspects, the communication device 104 and/or a remote server communicably coupled to the communication device 104 via the internet can implement a machine learning and/or artificial intelligence algorithm to process signals received from the one or more sensors 106, to more effectively characterize conditions associated with the equipment 102. For example, the one or more sensors 106 may generate signals associated with a pressure applied to the equipment 102, an operating temperature of the equipment 102, and/or a history of mechanical excitations associated with the equipment 102. Accordingly, any of the communication device 104, a remote server communicably coupled to the communication device 104, and/or the one or more sensors 106 themselves can be configured to characterize a condition (e.g., damage, wear, fatigue, etc.) of the equipment 102.

Still referring to FIG. 1, it shall be appreciated that the communications device 104 can be configured to communicate with a blockchain network 107 via one or more application program interfaces ("APIs") 110 configured as an interface that enables two or more computer programs to communicate with each other via a particular specification or protocol. For example, the one or more APIs can include an oracle, any suitable Web3.0 API, and/or a blockchain entry point (e.g., Infura.io, Wyred, etc.). The one or more APIs 110 can further facilitate communication with a billing party's website 111; however, according to some nonlimiting aspects, the billing party's website 111 can independently communicate with the blockchain network 107 via the internet 108. The blockchain network 107 can be specifically configured to host a distributed ledger 210 (FIG. 3) that securely tracks the ownership tokens (e.g., nonfungible tokens, cryptocurrencies, etc.) and facilitates transactions between a payor's wallet 114 and the billing party's wallet 112, as will be described in further detail with reference to FIG. 3. Accordingly, it shall be appreciated that the system 100 of FIG. 1 can be implemented to autonomously monitor and characterize a payor's use of equipment 102, via the sensors 106 and communication device 104, and automatically debit a payor's wallet 114 based on the characterized use or wear.

Figure 2:
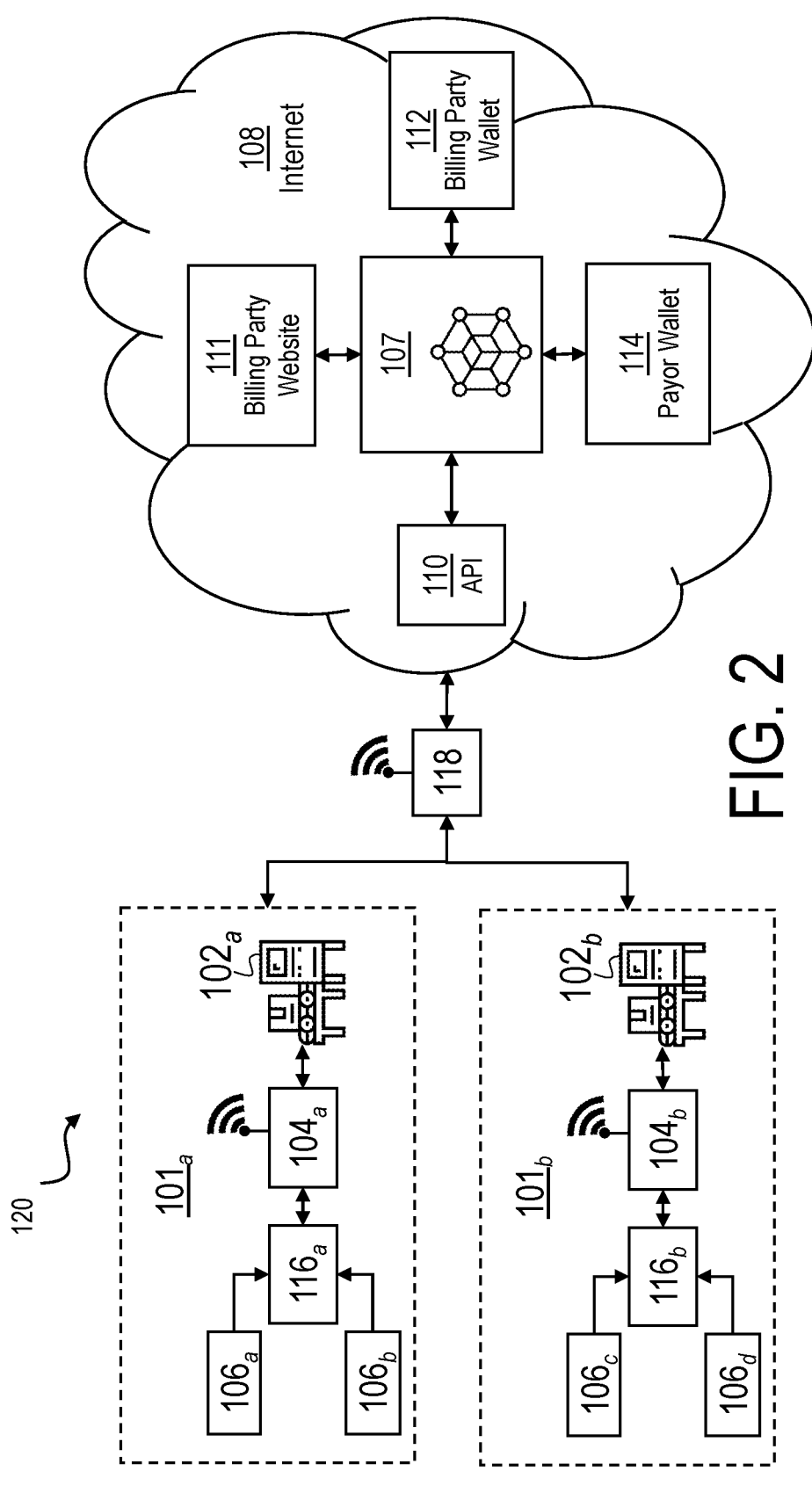
FIG. 2 illustrates a block diagram of another system configured to manage the operation of equipment and automatically bill customers for use of the equipment, in accordance with at least one non-limiting aspect of the present disclosure.

Referring now to FIG. 2, a block diagram of another system 120 configured to manage the operation of equipment and automatically bill customers for use of the equipment is depicted in accordance with at least one non-limiting aspect of the present disclosure. Similar to the system 100 of FIG. 1, the system 120 of FIG. 2 can be configured to monitor equipment $102_a$, $102_b$. However, according to the non-limiting aspect of FIG. 2, the system 120 can be configured to monitor two or more pieces of equipment $102_a$, $102_b$ positioned in two or more different physical environments $101_a$, $101_b$. According to some non-limiting aspects, the first physical environment 101, can be positioned in a different room, facility, region, and/or country relative to the second physical environment $101_b$. In other non-limiting aspects, it shall be appreciated that the equipment $102_a$, $102_b$ can be leased to the same entity or two separate entities.

Nonetheless, according to the non-limiting aspect of FIG. 2, a gateway 118, or centralized hub configured to connect IoT devices, such as communication devices $104_a$, $104_b$, and sensors $106_{a-d}$ configured to monitor each piece of equipment $102_a$, $102_b$, can transmit data to and from the internet 108 for cloud-based computing and/or data processing. Of course, as previously discussed, the communication devices $104_a$, $104_b$ can also be configured to perform the requisite processing of data generated by the sensors $106_{a-d}$ locally.

In further reference to FIG. 2, each physical environment 101a, 101b can include one or more sensors 106a-d configured to detect conditions associated with the equipment 102a, 102b. For example, according to the non-limiting aspect of FIG. 2, each physical environment 101a, 101b can include a vibration sensor 106a, 106d and a pressure sensor 106b, 106c, configured to interface with a data acquisition unit ("DAU") 116a, 116b. Of course, according to other non-limiting aspects, the sensors 106a-d can be configured to detect any condition associated with the equipment 101a, 101b. The DAUs 116a, 116b can aggregate the data generated by each sensor 106a-d such that the communication devices 104a, 104b can contextualize the data and generate a more holistic and accurate characterization of each piece of equipment 102a, 102b. Thus, it shall be appreciated that the DAUs 116a, 116b can be especially beneficial when multiple sensors 106a-d are deployed across multiple physical locations 101a, 101b.

Similar to the non-limiting aspect of FIG. 1, it shall be appreciated that the gateway 118 of FIG. 2 can be configured to communicate with a blockchain network 107 via one or more application program interfaces (APIs) 110 configured as an interface that enables two or more computer programs to communicate with each other via a particular specification or protocol. The one or more APIs 110 can further facilitate communication with a billing party's website 111; however, according to some non-limiting aspects, the billing party's website 111 can independently communicate with the blockchain network 107 via the internet 108. The blockchain network 107 can be specifically configured to host a distributed ledger 210 (FIG. 3) that securely tracks the ownership tokens (e.g., non-fungible tokens, cryptocurrencies, etc.) and facilitates transactions between a payor's wallet 114 and the billing party's wallet 112, as will be described in further detail with reference to FIG. 3. Accordingly, it shall be appreciated that the system 120 of FIG. 2 can also be implemented to autonomously monitor and characterize a payor's use of equipment $102_a$, $102_b$ via the sensors $106_{a-d}$ and communication devices $104_a$, $104_b$, and automatically debit a payor's wallet 114 based on the characterized use or wear.

It shall be further appreciated that, according to the non-limiting aspects of FIGS. 1 and 2, the systems 100, 120 can include several different potential configurations for wear-based billing and wear-based control. Each system 100, 120 can include exemplary individual analog or smart sensors (e.g., vibration, temperature, pressure, etc.) to provide wear data to the illustrated data processors (e.g., IoT devices 104a, 104b of FIG. 2, DAUs 116a, 116b of FIG. 2, etc.). Additionally, the systems 100, 120 can be configured such that an exemplary electrical on-off feature (e.g., run enable output) can enable a pertinent data processor component to shut off the equipment 102 or, 102a, 102b (collectively referred to as "equipment 102") under certain conditions (e.g., if the equipment 102 condition exceeds a threshold, if the payor account is not in good standing, etc.). According to other non-limiting aspects, equipment 102 on-off capability can instead be enabled with a communications bus (e.g., CAN bus for engines, PLC protocol, such as MODBUS, etc.) or any other suitable communication devices or protocols.

Additionally, the non-limiting aspects of FIGS. 1 and 2 illustrate an exemplary internet 108 entry point, or API 110. As previously discussed, API 110 can be, for example, an oracle, any suitable Web3 API, and/or a blockchain 107 entry point (e.g., Infura.io, Wyred, etc.). However, according to other non-limiting aspects, an API 110 entry point may not be necessary. For example, data or commands may be submitted (e.g., by the data processor or gateway 118) directly to a payor wallet 114, blockchain 107 node, biller wallet 112, distributed ledger 210 (FIG. 3) or in any other suitable manner. As will be discussed in further detail with reference to FIG. 3, each illustrated crypto wallet 112, 114 may include a public and a private key. For example, the key may include a first number representing a public address for that wallet that is recorded on the distributed blockchain 107 ledgers 210 (FIG. 3), and a second number representing a private code that is kept secret by the owner and used for approving expenditures. In some instances, wallet software may be used to keep track of these two numbers.

Figure 3:
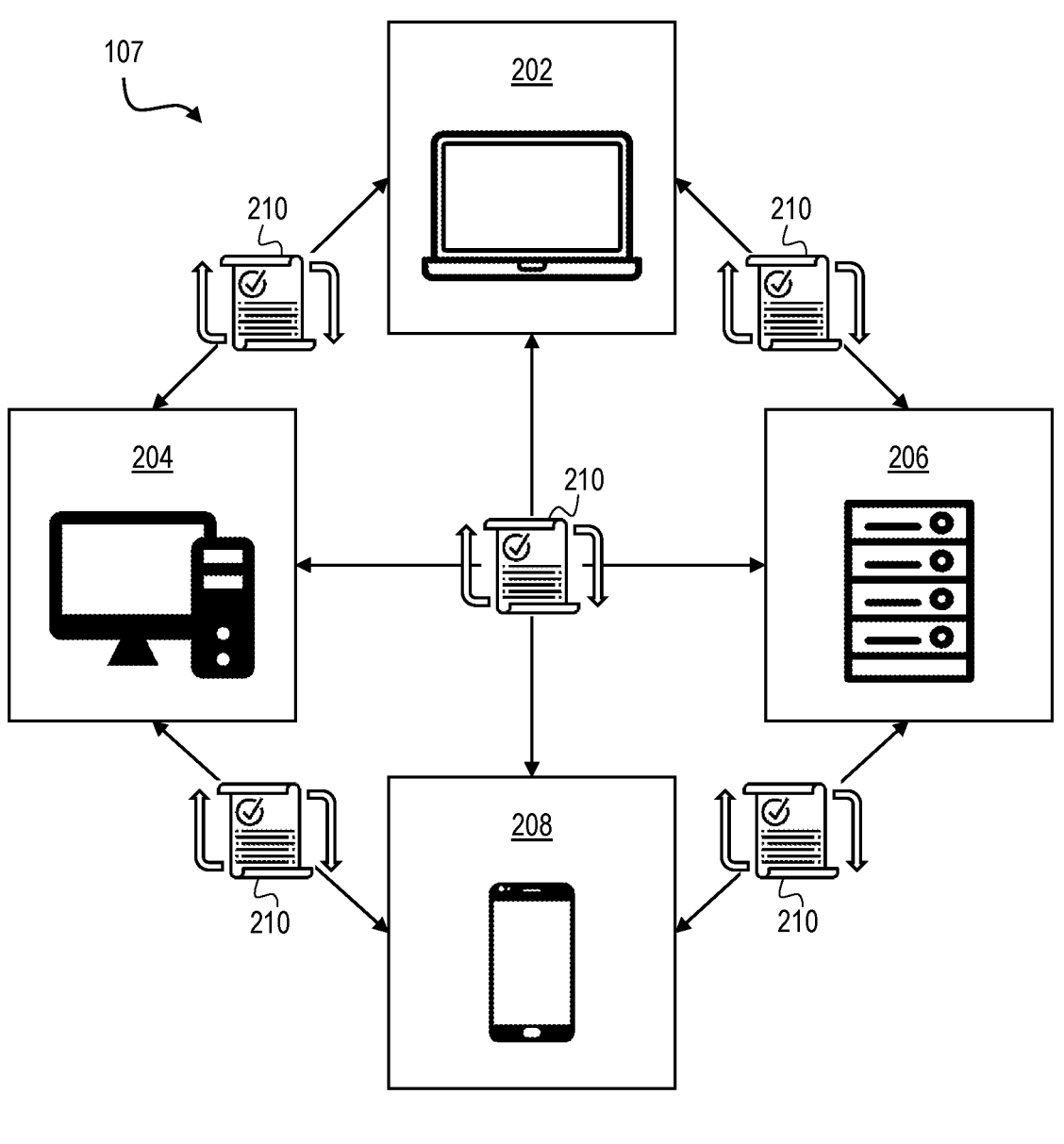
FIG. 3 illustrates a block diagram of a system for implementing a blockchain network configured for use with the systems of FIGS. 1 and 2, in accordance with at least one non-limiting aspect of the present disclosure.

Referring now to FIG. 3, a block diagram of a system for implementing a blockchain network 107 configured for use with the systems 100, 120 of FIGS. 1 and 2 is depicted in accordance with at least one non-limiting aspect of the present disclosure. According to the non-limiting aspect of FIG. 3, the blockchain network 107 can include one or more nodes 202, 204, 206, 208 configured to interact with each other such that the nodes 202, 204, 206, 208 can collectively host, modify, and verify a distributed ledger 210. For example, according to the non-limiting aspect of FIG. 3, the blockchain network 202 can include one or more laptop computers 202, personal computers 204, servers 206, and/or mobile computing devices 208, such as a smart phone and/or a tablet. However, it shall be appreciated that the non-limiting aspect of FIG. 3 is merely illustrative. As such, the blockchain network 107 can include any number and/or type of nodes 202, 204, 206, 208 necessary to effectively host, modify, and verify a distributed ledger 210. Moreover, certain privileges associated with the distributed ledger 210 can be selectively allocated to certain nodes 202, 204, 206, 208 of the blockchain network 107. For example, most notes may be configured only to verify or validate the distributed ledger 210, while a select number of nodes may have the ability to modify the distributed ledger 210 and/or generate new blocks.

According to the non-limiting aspect of FIG. 3, the distributed ledger 210 can include records of transactions conducted between accounts associated with the blockchain network 107. For example, the distributed ledger 210 can include records associated with transactions executed via smart contracts, or code that automatically executes all components of an agreement that is then stored in the distributed ledger 210. The code itself can be replicated across the multiple nodes 202, 204, 206, 208 of a blockchain 107 and, therefore, the distributed ledger 210 and its records benefit from the security, permanence, and immutability provided by the blockchain 107. Notably, the blockchain network 107 can include any foundational, "layer two," or tributary chain, including chains such as the Bitcoin blockchain, Ethereum, Polygon, Arbitrum, and/or Loopring, amongst others.

In further reference to FIG. 3, a user operating a user device (e.g., one of the nodes 202, 204, 206, 208) or a computing device in communication with a node 202, 204, 206, 208, can initiate a transaction by generating a cryptographically signed message and sending the message to blockchain network 107. The message can include transaction data such as information pertaining to an object of the transaction (e.g., a cryptocurrency, a NFT, etc.), a recipient, and/or an amount associated with the transaction, amongst other information. Once a node 202, 204, 206, 208 receives the message, the node 202, 204, 206, 208 can distribute the message to the other nodes 202, 204, 206, 208 in the blockchain network 107.

According to some non-limiting aspects, each of the nodes 202, 204, 206, 208 of the blockchain network 107 can include the transaction represented in the generated message in a block of other transactions and can attempt to validate or cryptographically solve the block. The first node 202, 204, 206, 208 that solves the block can provide the solution to the other validation nodes for verification, and ledger 210 maintained at each of the nodes 202, 204, 206, 208 can be updated to add the block to the distributed ledger 210 to effect the transaction. As an incentive to cryptographically solve blocks-which consumes electricity and computing resources-select nodes 202, 204, 206, 208 can earn at least a part of a token hosted on the distributed ledger 210 (e.g., a cryptocurrency) and/or a fee for participating in the validation of the block.

As such, it shall be appreciated that the distributed ledger 210-and more generally, the blockchain network 107-of FIG. 3 can be used to track transactions and ownership of any number of digital assets, including cryptocurrencies and/or NFTs. Thus, because the systems 100, 120 of FIGS. 1 and 2 are particularly configured to monitor the use of equipment 102 (FIGS. 1 and 2) and interface with the blockchain network 107 of FIG. 3, the systems 100, 120 (FIGS. 1 and 2) can debit a payer's wallet 114 (FIGS. 1 and 2) in an amount corresponding to the amount of use and/or wear inflicted on the equipment 102 (FIGS. 1 and 2). According to some non-limiting aspects, the amount a payer's wallet 114 (FIGS. 1 and 2) is debited can be programmed into the smart contract and determined in accordance with an algorithm that scales the payment to the amount of use and/or wear associated with the equipment 102 (FIGS. 1 and 2). The system 100, 120 (FIGS. 1 and 2) and/or the API 110 (FIGS. 1 and 2) can issue an API call that includes a public key and/or a private key, amongst other cryptographic information that can be used to facilitate the transaction on the blockchain network 107. Having received the API call from the API 110 (FIGS. 1 and 2), the blockchain network 107 can use the public key cryptography to locate the payer's wallet 114 (FIGS. 1 and 2) on the blockchain network 107. However, every public key matches to only one private key and thus, exclusive ownership of the payer's wallet 114 (FIGS. 1 and 2) and thus, the cryptocurrency asset, can only be transferred to the billing wallet 112 (FIGS. 1 and 2) using the provided private key. In other words, anyone can locate wallets and send transactions to an address associated with a public key, but only the private key can unlock the asset and verify the owner as recipient of the asset received in the last transaction recorded in the distributed ledger 210.

Referring now to FIG. 4, a flow chart of a method 400 of monitoring a customer's use of equipment 102 (FIGS. 1 and 2) and billing via a blockchain network 107 (FIGS. 1-3), in accordance with at least one non-limiting aspect of the present disclosure. According to the non-limiting aspect of FIG. 4, the method 400 can include configuring, via, e.g., a website portal 112 (FIGS. 1 and 2), a smart contract to monitor and rent or lease 402 equipment 102 (FIGS. 1 and 2) to a user who will agree to pay for use of the equipment 102 (FIGS. 1 and 2) in accordance with the terms of the smart contract. The method 400 can further include entering an agreement to rent or lease 404 equipment 102 (FIGS. 1 and 2) to an actual user in accordance with the terms of the smart contract. The method 400 can further include config- uring 406, via, e.g., the website portal 112 (FIGS. 1 and 2), the payer's account, ensuring the public and private keys are verified and configured to enable transactions via the block- chain network 107 (FIGS. 1-3). After the requisite configu- ration 406, the system 100, 120 (FIGS. 1 and 2) can be configured to monitor 408 use of the equipment 102 (FIGS. 1 and 2) via the sensors 106 (FIGS. 1 and 2) and commu- nication device (FIGS. 1 and 2).

Having monitored 408 the equipment 102 (FIGS. 1 and 2) usage, the method 400 of FIG. 4 can further include char- acterizing 410 the equipment 102 (FIGS. 1 and 2) usage, including any wear, damage, and/or hours the equipment 102 (FIGS. 1 and 2) was run during a period. The charac- terization 410 can then be transmitted 412 to the blockchain network 107 (FIGS. 1-3) via the communication device 104 (FIGS. 1 and 2) and/or a gateway 118 (FIG. 2). Based on this characterization 410, the method 400 can include determin- ing 414 an amount to bill the payer via the blockchain network 107 (FIGS. 1-3) in accordance with the terms of the smart contract. The blockchain network 107 can subse- quently verify 416 whether the payer wallet 114 (FIGS. 1 and 2) has enough funds to satisfy the bill. Assuming the payer's wallet 114 (FIGS. 1 and 2) is verified, the method 400 can include transferring 422 the funds from the biller's wallet 112 (FIGS. 1 and 2). However, if the payer's wallet 114 (FIGS. 1 and 2) is not verified, the method can include transmitting 418 an inhibit message to the communication device 104 (FIGS. 1 and 2) of the system 100, 120 (FIGS. 1 and 2). The communication device 104 (FIGS. 1 and 2) can subsequently inhibit 420 the payer's usage of the equipment 102 (FIGS. 1 and 2) in response to receiving the inhibit message.

Figure 5:
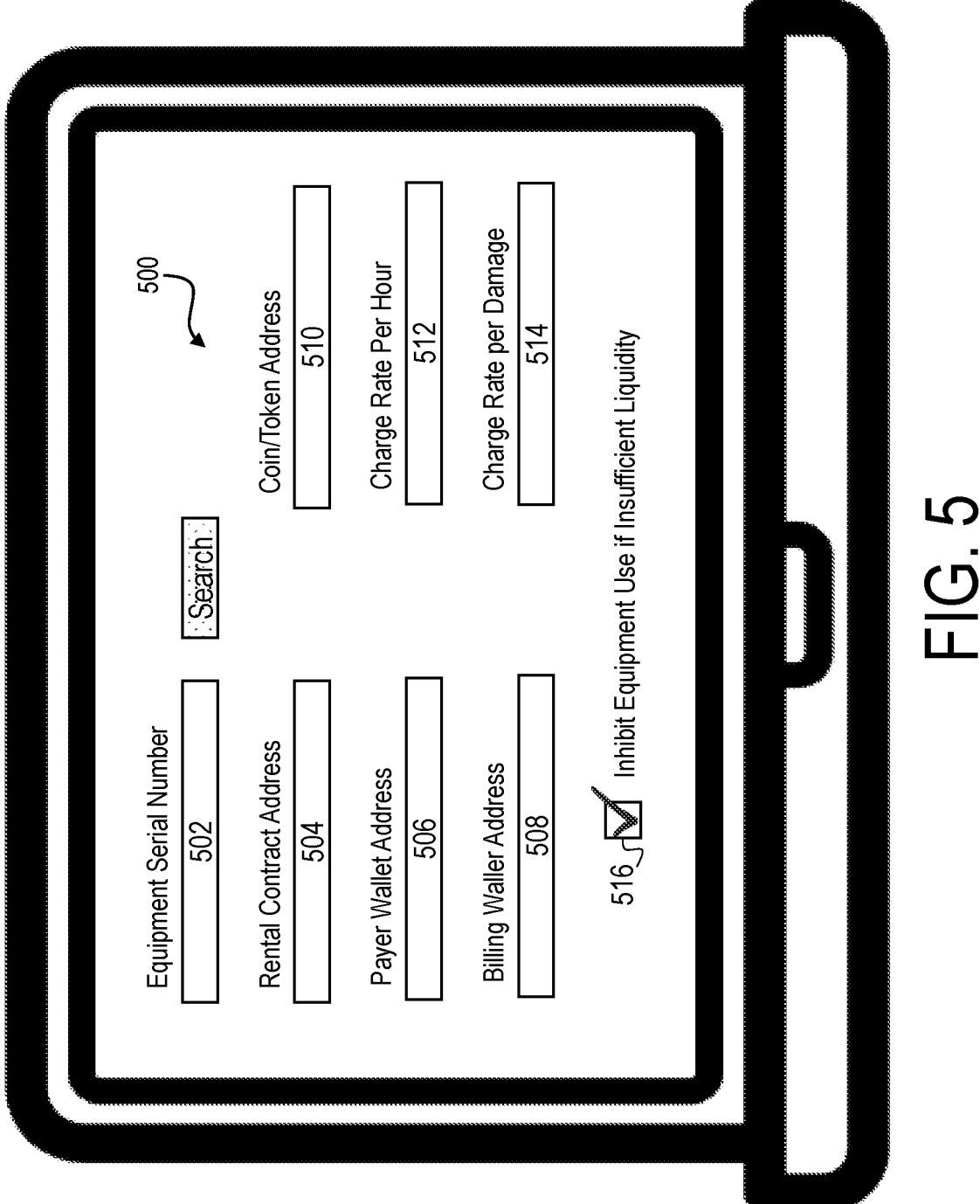
FIG. 5 illustrates a user interface configured for use by the systems of FIGS. 1 and 2, in accordance with at least one non-limiting aspect of the present disclosure.

Referring now to FIG. 5, a user interface 500 configured for use with the systems 100, 120 of FIGS. 1 and 2 is depicted in accordance with at least one non-limiting aspect of the present disclosure. The user interface 500 of FIG. 5 can be configured to be accessed via any computing device (e.g., personal computer, laptop computer, smartphone, tab- let, smart watch, etc.) of a user. According to the non- limiting aspect of FIG. 5, the user interface 500 can include a field 502 in which the user can search for or enter an equipment 102 (FIGS. 1 and 2) identifier, such as a serial number. Another field 504 can be configured to receive a rental contract address associated with a physical location 101 (FIGS. 1 and 2) in which the equipment 102 (FIGS. 1 and 2) will be located. Several form fields 506, 508 can be used to enter the payer and/or billing party's wallet identi- fier, such as a public or private key for the wallet. Another field 510 can be configured to receive an address associated with a token or other digital asset to be used by the systems 100, 120 (FIGS. 1 and 2). A charge rate per hour can be entered via another form field 512 and a charge rate per damage can be entered via still another form field 514. Accordingly, the user interface 500 of FIG. 5 can be used to configure the smart contract by which the systems 100, 120 (FIGS. 1 and 2) debit the payer's account via the blockchain network 107 (FIGS. 1-3). Notably, the user interface 500 can further include a check box 516 configured to inform the systems 100, 120 (FIGS. 1 and 2) and more specifically, the communication devices 104 (FIGS. 1 and 2), to inhibit equipment 102 (FIGS. 1 and 2) usage if the payer's wallet 114 (FIGS. 1 and 2) has insufficient funds. Such inhibition can include limiting and/or completely ceasing operation of the equipment 102 (FIGS. 1 and 2) until the payers wallet 114 (FIGS. 1 and 2) has sufficient funds to pay outstanding dues.

It shall be appreciated form the method 400 of FIG. 4 and the user interface 500 of FIG. 5, how the systems 100, 120 (FIGS. 1 and 2) can be utilized to monitor equipment 102 (FIGS. 1 and 2) usage and enact wear-based billing and wear-based control via several exemplary parameters, or properties, relating to the equipment 102 (FIGS. 1 and 2) usage. These parameters can be adjusted, viewed, and/or tracked by the billing party via the billing party website 111 (FIGS. 1 and 2), as enabled via the API 110 (FIGS. 1 and 2) (e.g., on a smart contract configuration interface). These parameters can be provided to a processor, such as that of the communication device 104 (FIGS. 1 and 2), or IoT device, and stored in a smart contract on the blockchain network 107 (FIGS. 1-3). In some embodiments, all of the illustrated values may be entered by the billing party, except, if desired, entries for "Wallet Balance" may be refreshed by the smart contract and entries for the payor information may be provided by the payer. If desired, the parameters or proper- ties entered via the user interface 500 of FIG. 5 that can be presented via a display on the IoT device 104 (FIGS. 1 and 2), to allow some or all of the smart contract parameters to adjusted and/or viewed on site (or remotely, if desired). This can alleviate the need for a separate billing party website 111 (FIGS. 1 and 2). It should be noted that the exemplary embodiments shown in FIGS. 1-5 can be modified to be used in other arrangements not involving smart contracts or blockchain networks 107 (FIGS. 1 and 2). For example, according to some non-limiting aspects, the blockchain network 107 can be substituted with a traditional banking server configured to process transactions between the billing party and the payer.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, meth- ods, uses and applications that have not been specifically addressed herein but are, or will become, apparent from the description herein, the appended drawings and claims.

The methods that may be described above, claimed herein or are apparent from this patent application and any other methods which may fall within the scope of any appended claims can be performed in any desired suitable order and are not necessarily limited to any sequence described herein or as may be listed in any appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of manufacture, assembly or use, are possible, contemplated by the patent applicant(s), within the scope of this patent application and any appended claims, and may be made and used by one of ordinary skill in the art without departing from the spirit or teachings of this patent application and scope of any appended claims. Thus, all matter herein set forth or shown in the accompanying drawings should be interpreted as illustrative, and the scope of the disclosure and any appended claims should not be limited to the embodiments described and shown herein.

Various aspects of the subject matter described herein are set out in the following numbered clauses:

Clause 1: A method of billing a payor based upon wear to an item of equipment, the method including: at least one data processor proximal to the equipment item automatically charging the payor in cryptocurrency based upon the duration of use or amount of vibration, pressure, flow rate or temperature that the equipment item is subjected to.

Clause 2: The method according to clause 1, further including the data processor downloading a fee schedule from a centralized server.

Clause 3: The method according to either clause 1 or 2, further including the data processor determining the amount of cryptocurrency to charge the payor based upon the signatures of vibration or pressure spikes during use of the equipment.

Clause 4: The method according to any of clauses 1-3, further including the data processor submitting information to a Smart Contract.

Clause 5: The method according to any of clauses 1-4, further including the Smart Contract implementing special criteria for calculating the charges based upon usage hours.

Clause 6: The method according to any of clauses 1-5, further including the Smart Contract implementing special criteria for calculating the charges based upon damage factors.

Clause 7: The method according to any of clauses 1-6, further including the Smart Contract providing a public property that indicates the payor has sufficient liquidity in their wallet to allow continued operation of the equipment.

Clause 8: The method according to any of clauses 1-7, where the data processor provides an electrical output to the equipment to allow its continued operation when the public property of the Smart Contract shows the payor is in good financial standing.

Clause 9: The method according to any of clauses 1-8, further including one or more smart sensors coupled to the equipment sending vibration, pressure, flow or temperature information to the data processor, and the data processor initiating the cryptocurrency transaction.

Clause 10: The method according to any of clauses 1-9, further including the data processor submitting the charges to a credit card processor.

Clause 11: The method according to any of clauses 1-10, further including the data processor reducing days of invoicing, thereby putting the payor's money to work faster which provides cost benefits.

Clause 12: The method according to any of clauses 1-11, wherein the data processor include an IOT device.

Clause 13: The method according to any of clauses 1-12, wherein the data processor includes a DAU and an IOT device.

Clause 14: An apparatus for charging fees to a renter of equipment based upon wear to an item of equipment, the apparatus including: a communication device proximal to the equipment that charges the renter based off of the amount of vibration, pressure, flow rate, or temperature that the item of equipment is subjected to.

Clause 15: The apparatus according to clause 14, wherein the communication device downloads a fee schedule from a centralized server.

Clause 16: The apparatus according to either of clauses 14 or 15, wherein the amount of cryptocurrency the renter is charged is based off of certain signatures of vibration or pressure spikes.

Clause 17: The apparatus according to any of clauses 14-16, wherein the communication device submits information to a smart contract.

Clause 18: The apparatus according to any of clauses 14-17, wherein the communication device is an IOT gateway, further including smart sensors that send the vibration, pressure, flow, and temperature information to the IOT gateway which handles the crypto currency transaction.

Clause 19: The apparatus according to any of clauses 14-18, wherein the IOT gateway submits the charges to a credit card processor.

Clause 20: The apparatus according to any of clauses 14-19, wherein the smart contract has special methods for calculating the charges based off of usage hours.

Clause 21: The apparatus according to any of clauses 14-20, wherein the smart contract has special methods for calculating the charges based off of damage factors.

Clause 22: The apparatus according to any of clauses 14-21, wherein the smart contract has a public property that can be read stating that the renter has sufficient liquidity in their wallet to allow operation of the equipment.

Clause 23: The apparatus according to any of clauses 14-22, where the IOT device has an electrical output to enable the operation of the equipment when the public property of the smart contract shows that the renter is in good financial standing.

Clause 24: The apparatus according to any of clauses 14-23, wherein the IOT device is releasably coupled to the equipment with one or more magnets.

Clause 25: The apparatus according to any of clauses 14-24, wherein properties or parameters for billing the renter may be stored on a web server residing inside, and accessible from, the data processor.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. An internet-of-things device configured to manage operation of equipment and automatically debit a user for operation of the equipment, the device comprising:
   a sensor configured to generate signals associated with an operating parameter of the equipment, wherein the operating parameter comprises a vibration, a pressure, a flow rate, or a temperature, or combinations thereof;
   a communication device communicably coupled to the sensor; and
   a processor communicably coupled to the communication device and a blockchain network, wherein the processor is configured to:
      receive a signal generated by the sensor from the communication device;
      generate a characterization of a condition of the equipment based on the received signal, wherein the condition is associated with wear, damage, unauthorized use, misuse, or underuse of the equipment, or combinations thereof;
      correlate the characterized condition to a predetermined parameter associated with the equipment;
      determine a cost associated with the characterized condition based on the predetermined parameter;
      determine whether an account of the user comprises an account balance sufficient to pay the determined cost, wherein the account balance is stored on a distributed ledger hosted by a blockchain network; and
      transmit a signal comprising a command to inhibit alter operation of the equipment based on the characterized condition.

2. The internet-of-things device of claim 1, wherein the processor is further configured to instruct the blockchain network to autonomously transfer an asset associated with the determined cost from the account of the user to an account of an owner of the equipment.

3. The internet-of-things device of claim 1, wherein the processor is further configured to determine a scope of alteration based on the predetermined parameter.

4. The internet-of-things device of claim 3, wherein the determined scope of alteration comprises a prohibition of the user from continuing to operate the equipment.

5. The internet-of-things device of claim 3, wherein the determined scope of alteration comprises a restriction of the user from continuing to operate the equipment at full capacity.

6. The internet-of-things device of claim 1, wherein the predetermined parameter is stored on the distributed ledger hosted by the blockchain network.

7. The device of claim 1, wherein the sensor comprises at least one of an imaging sensor, a mechanical sensor, and an electrical sensor, or combinations thereof.

8. The device of claim 7, wherein the imaging sensor comprises a visible light camera, an infrared camera, a color sensor, and a video camera, or combinations thereof.

9. The device of claim 7, wherein the mechanical sensor comprises a temperature sensor, a pressure sensor, an accelerometer, a gyroscope, a position sensor, a flow sensor, a fan sensor, and a level sensor, or combinations thereof.

10. A system configured to manage operation of equipment and automatically debit a user for operation of the equipment, the system comprising:
   a sensor configured to generate signals associated with an operating parameter of the equipment wherein the operating parameter comprises a vibration, a pressure, a flow rate, or a temperature, or combinations thereof;
   a communication device communicably coupled to the sensor; and
   a processor communicably coupled to the communication device and a blockchain network, wherein the processor is configured to:
      receive a signal generated by the sensor from the communication device;
      generate a characterization of a condition of the equipment based on the received signal, wherein the condition is associated with wear, damage, unauthorized use, misuse, or underuse of the equipment, or combinations thereof;
      correlate the characterized condition to a predetermined parameter associated with the equipment;
      determine a cost associated with the characterized condition based on the predetermined parameter;
      determine whether an account of the user comprises an account balance sufficient to pay the determined cost; and
      transmit a signal comprising a command to alter operation of the equipment based on the characterized condition.

11. The system of claim 10, wherein the processor is remotely located relative to the sensor and the communication device.

12. The system of claim 10, wherein the processor is further configured to instruct the blockchain network to autonomously transfer an asset associated with the determined cost from the account of the user to an account of an owner of the equipment.

13. A computer-implemented method of managing operation of equipment and automatically debiting a user for operation of the equipment, the method comprising:
   storing, via a processor, a predetermined parameter associated with the equipment on a distributed ledger hosted by a blockchain network;

receiving, via the processor, a signal generated by a sensor, wherein the signal is associated with an operating parameter of the equipment, wherein the operating parameter comprises a vibration, a pressure, a flow rate, or a temperature, or combinations thereof;

generating, via the processor, a characterization of a condition of the equipment based on the received signal, wherein the condition is associated with wear damage, unauthorized use, misuse, or underuse of the equipment, or combinations thereof;

correlating, via the processor, the characterized condition to the predetermined parameter associated with the equipment;

determining, via the processor, a cost associated with the characterized condition based on the predetermined parameter; and determining, via the processor, whether an account of the user comprises an account balance sufficient to pay the determined cost, wherein the account balance is stored on a distributed ledger hosted by a blockchain network; and transmitting, via the processor, a signal comprising a command to alter operation of the equipment based on the characterized condition.

14. The computer-implemented method of claim 13, further comprising instructing, via the processor, the blockchain network to autonomously transfer an asset associated with the determined cost from the account of the user to an account of an owner of the equipment.

15. The computer-implemented method of claim 13, further comprising determining, via the processor, a scope of alteration based on the predetermined parameter.

16. The computer-implemented method of claim 15, wherein the determined scope of alteration comprises a prohibition of the user from continuing to operate the equipment.

17. The computer-implemented method of claim 15, wherein the determined scope of alteration comprises a restriction of the user from continuing to operate the equipment at full capacity.

* * * * *